INVENTOR
J. G. GRIBBONS
BY Walter M. Thiel
ATTORNEY

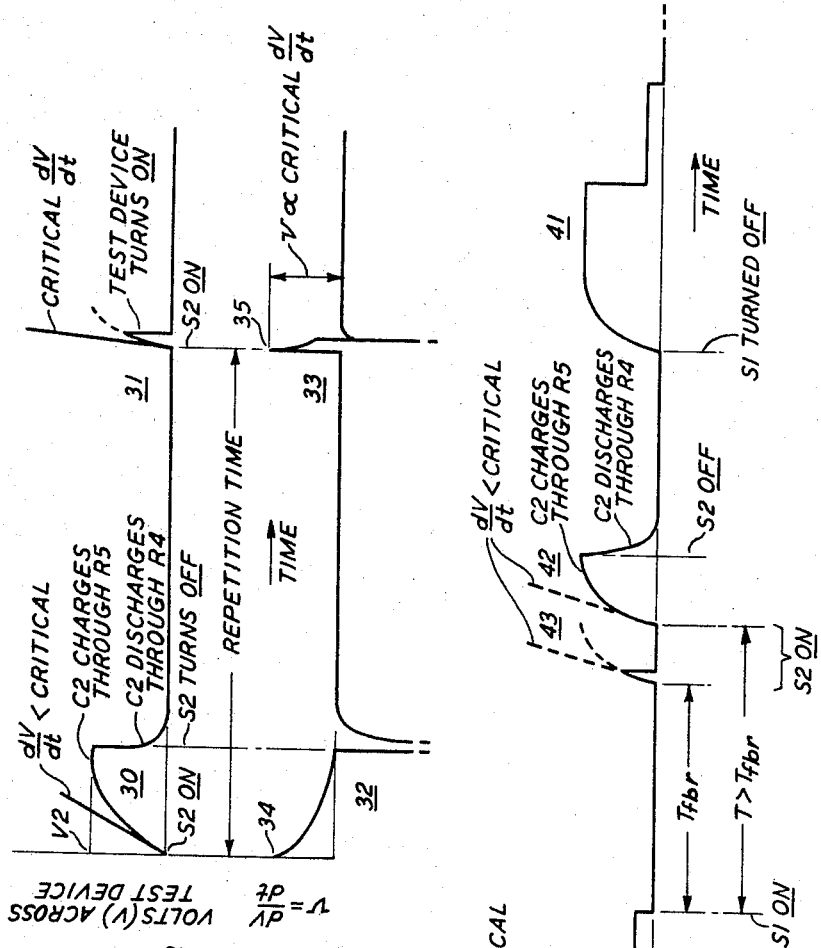
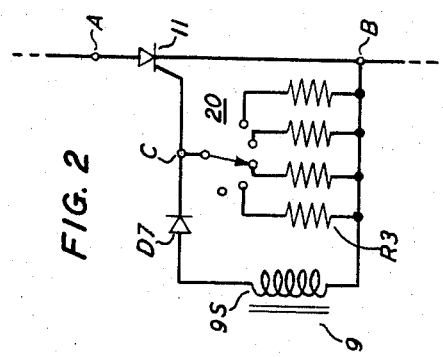
FIG. 2
FIG. 3
FIG. 4

United States Patent Office 3,436,661
Patented Apr. 1, 1969

3,436,661
TEST SET FOR MEASURING THE RATE EFFECT AND THE FORWARD BLOCKING RECOVERY TIME OF THYRISTORS
John G. Gribbons, Rockaway, N.J., assignor to Bell Telephone Laboratories, Incorporated, Berkeley Heights, N.J., a corporation of New York
Filed June 22, 1966, Ser. No. 559,479
Int. Cl. G01r 31/22
U.S. Cl. 324—158                                    10 Claims

ABSTRACT OF THE DISCLOSURE

A test set for measuring the rate effect and the forward blocking recovery time of thyristors. The circuit includes means for rapidly progressing through the three-step sequence of (1) passing current through the thyristor, (2) suddenly cutting the current off, and (3) after a measured time interval applying a voltage across the device at a rate of rise less than that which will turn on the fully recovered device. No current flows through the device during this time interval. The time interval is gradually shortened until the device conducts upon applying the voltage. This interval determines the forward blocking recovery time. The time interval is then set greater than this recovery time and a voltage is repeatedly applied to the device, its rate of rise being gradually increased until the device again starts to conduct. The rate of voltage rise when conduction begins determines the intrinsic $dv/dt$ (rate effect) parameter.

---

Figure 1:
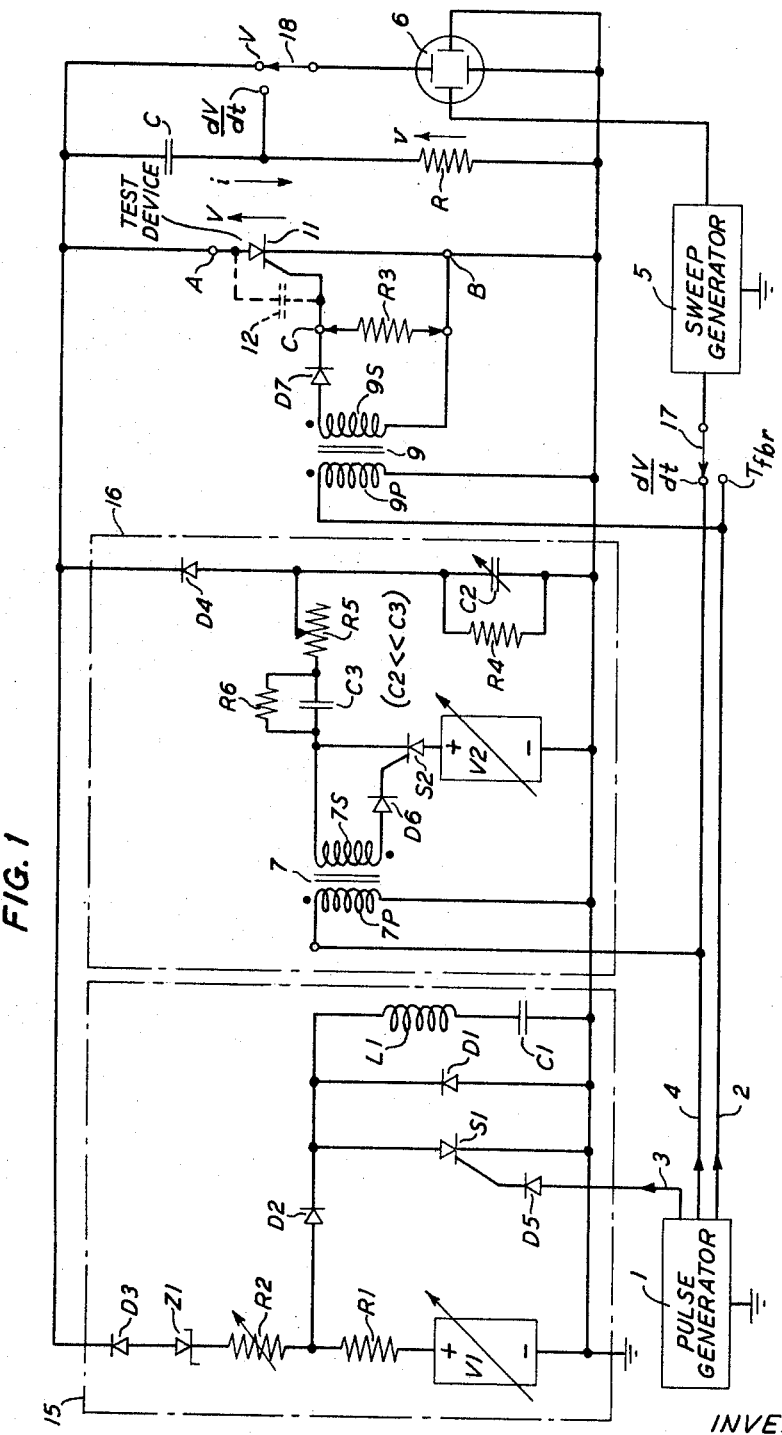

This invention relates to the art of electrical measurements and more particularly to a circuit for measuring the rate effect and the forward blocking recovery time of thyristors.

There are two parameters of particular importance when designing high speed switching circuits involving thyristors. These are the forward blocking recovery time $T_{\text{fbr}}$ and the $dv/dt$ (rate effect) capability of the thyristor. Both of these parameters are critically affected by any resistance across the thyristor gate and cathode terminals as well as by the amount of charge stored in the thyristor's middle junction. The amount of reverse current supplied by the circuits also critically affects these parameters.

Measurements of the forward blocking recovery time of the thyristor have heretofore been made under conditions where the test circuits cause currents to flow through the thyristor during its recovery period so that the test results were meaningless except where the thyristor was to be used in a circuit providing this same amount of current. The forward blocking recovery time is defined as the minimum period between the instant the forward current ceases to flow and the instant a forward voltage may be reapplied at a specified rate without restarting forward current flow. To properly compare the blocking capability of different thyristors, it is desirable that this parameter be determined as the true or intrinsic property without any reverse current to aid recovery and without any external shunt resistance across its gate and cathode terminals.

The $dv/dt$ capability is defined as the maximum rate at which the forward anode-to-cathode supply voltage may be applied without starting forward conduction through the thyristor. While this parameter is strongly affected by the amount of residual charge stored in the middle junction of the thyristor, it is also affected by the amount of external circuit resistance shunted across the thyristor's gate and cathode terminals. To compare the intrinsic $dv/dt$ capabilities of different thyristors, it is also desirable that this parameter be determined without an external shunt resistance and only after the thyristor has fully recovered. However, for circuit design purposes it is also desirable that the effect of the gate-to-cathode resistance on both the forward blocking recovery time and the $dv/dt$ capability be quantitatively determined.

It is an object of this invention to measure both the forward blocking recovery time and the $dv/dt$ capability of a thyristor either as intrinsic properties or as they are affected by operating circuit conditions.

The foregoing object is achieved by this invention which comprises a circuit to which a thyristor under test may be connected and caused to carry current for a period of time after which the current is removed. Circuit means then applies a voltage across the anode and cathode at a controlled rise rate, less than that which would turn on a fully recovered device. The time interval between the removal of the current and the application of the voltage is shortened until the device starts to conduct. This interval is the forward blocking recovery time. This interval is then increased beyond the recovery time and the rate of voltage rise is gradually increased until the device again starts to conduct. This rate of voltage rise when conduction begins is the intrinsic $dv/dt$ parameter to be determined. Additional circuit means is provided to connect known resistances in shunt with the gate and cathode terminals of the thyristor while the above measurements are repeated.

The invention may be better understood by referring to the accompanying drawings, in which:

FIG. 1 is a schematic diagram illustrative of the essential circuit features of a preferred embodiment of this invention;

FIG. 2 discloses a convenient conventional means for varying the shunt resistance across the gate and cathode terminals of the thyristor under test; and FIGS. 3 and 4 disclose oscillograms observed in the operation of this invention.

In FIG. 1, which discloses a preferred circuit embodiment of this invention, the thyristor 11 is the device under test. Its anode is connected to test terminal A, its cathode to test terminal B and its gate to test terminal C. Capacitor 12, shown connected by dotted lines between the anode and gate terminals of the thyristor, represents the inherent and stray capacitance existing between these two thyristor terminals. This capacitance is largely instrumental in causing the thyristor to turn on when an anode supply voltage is applied. A similar impedance also inherently exists between the gate and cathode terminals so that upon the application of the supply voltage across the anode and cathode terminals there will be a voltage division between capacitance 12 and the inherent impedance between the gate and cathode terminals such that if the voltage between the gate and cathode terminals rises above the critical gate voltage for the thyristor it will prematurely turn on. The magnitude of this voltage, of course, is a function of the rate at which the anode-to-cathode voltage is applied as well as a function of the stored charge remaining in the middle junction of the thyristor from previous conduction. Any additional impedance, such as resistor R3, connected between the thyristor's gate and cathode will alter this critical gate voltage.

In order to test the thyristor for the rate of voltage application at which it will turn on, means is provided in the test circuit for supplying a voltage across the anode and cathode test terminals A and B, respectively, at a controlled rate. This voltage is supplied by the circuitry within enclosure 16. In the performance of tests involving the forward blocking recovery time, it is essential that the thyristor under test be caused to first conduct current for a time after which this current is suddenly terminated. The circuitry for supplying this current is included in block 15 of FIG. 1. While block 15 is applying a voltage to the thyristor, the thyristor is turned on by a pulse supplied through transformer 9. The resulting current is subsequently terminated by switching means contained in block 15. The voltage across the test device as well as the rate at which the voltage is applied is observed by an oscilloscope 6 and its associated circuitry. The operation of the various switching means in the circuit as well as the actuation of oscilloscope 6 are all under control of a conventional pulse generator 1 having three output terminals 2, 3 and 4, respectively.

The current supply circuit 15 includes a direct voltage supply source V1 which may be varied to suit the requirements of the test. The negative terminal of this source is connected to ground and to the cathode test terminal B. The positive terminal of the source is connected to the anode test terminal A through a series circuit comprising a fixed resistor R1, a variable resistir R2, a Zener diode Z1 and a fast recovery diode D3. Shunted across source V1 and fixed resistor R1 is a diode D2 and a thyristor switch S1. It will be evident that when switch S1 is closed the voltage appearing at the junction between resistors R1 and R2 will be nearly zero, having a magnitude equal to the forward voltage drops through diode D2 and switch S1. After having been turned on by a pulse from conductor 3 acting through diode D5, switch S1 is automatically turned off by the resonant turn-off circuit comprising inductor L1, capacitor C1 and diode D1, the operation of which is quite conventional. Briefly, however, this operation may be described by considering first the instant before switch S1 is turned on. At this time capacitor C1 is charged to a voltage approximating that of the source voltage V1. When switch S1 is closed, a ringing current immediately starts from capacitor C1 through inductor L1 and in the forward direction through the switch S1. During the second half cycle of this ringing current, current first passes in the reverse direction through switch S1 to speed its recovery and then is bypassed by diode D1 as switch S1 recovers. Ringing current abruptly stops during the third half cycle when both diode D1 and switch S1 are opened. Capacitor C1 then immediately begins to recharge from source V1 through resistor R1, diode D2 and inductor L1.

The voltage immediately starts to rise exponentially across the test terminals A and B at substantially the instant switch S1 is opened. If the source voltage V1 is sufficiently high, Zener diode Z1 will promptly break down and permit the application of voltage through resistors R1 and R2 and diode D3. The voltage applied to terminals A and B will rapidly rise to substantially that of source V1, assuming, of course, that the thyristor under test does not start to conduct. A short time after this voltage has been fully applied to the thyristor, a pulse from generator 1 arrives over its output conductor 2 to the primary winding 9P of transformer 9. This will result in the generation of a pulse in the secondary 9S positive at the dotted end of this winding and this latter pulse is applied between the gate and cathode terminals C and B, respectively, through diode D7. This pulse will immediately turn the test device on and cause it to carry current from source V1 at a magnitude determined by the variable resistor R2. The thyristor is permitted to carry current for a time sufficient to establish stable conducting conditions therein. A second pulse from generator 1 is transmitted over its output conductor 3 through diode D5 to the gate terminal of switch S1 causing it to turn on and promptly lower the voltage at the junction of resistors R1 and R2 to substantially zero, thereby promptly terminating the current through the thyristor under test.

As previously mentioned, the circuitry in block 16 provides a controlled rate of voltage application to the anode and cathode test terminals A and B. This current is derived from a second direct voltage source V2, the negative terminal of which is grounded and the positive terminal of which is connected to a series circuit comprising variable resistor R5 and variable capacitor C2 through a thyristor switch S2. When switch S2 is made conducting, current flows from source V2 through the network comprising resistor R6 and capacitor C3, the variable resistor R5 and the capacitor C2, the latter being shunted by a resistor R4. These circuit elements are so proportioned that the rate of voltage rise is controlled, for all practical purposes, by resistor R5 and capacitor C2. The voltage across capacitor C2 rises exponentially with time and is applied to the test terminals A and B through a diode D4. As indicated in FIG. 1, the capacitance of capacitor C2 is small compared with the capacitance of capacitor C3 thus permitting resistor R5 and capacitor C2 to be the principal control elements for controlling the rate of voltage rise across the test terminals. As is well known, the maximum rate of voltage rise occurs at the instant the current starts to flow through capacitor C2 from source V2. This maximum rate of voltage rise is the $dv/dt$ rate which is considered in determining the rate of voltage application to the device under test. Referring again to the circuits in blocks 16 it will be seen that switch S2 is turned on by a pulse from generator 1 by way of output conductor 4 to the primary winding 7P of transformer 7. Taking note of the dots at the ends of the windings of transformer 7, it will be evident that a positive-going pulse coming from generator 1 over conductor 4 will give rise to a positive-going pulse at the dotted end of secondary winding 7S. This positive-going pulse is applied to the gate terminal of switch S2 through a diode D6, thus turning switch S2 on. Switch S2 subsequently turns off by current starvation when capacitor C2 becomes charged to a voltage approximating that of source V2. The direct current path through resistors R6, R5 and R4 provides less than a sustaining current for thyristor switch S2.

As previously mentioned, the impedance between the gate and cathode test terminals C and B has an effect on the $dv/dt$ capability of the test device. This may be varied to suit various circuit applications by introducing a shunt resistance represented by resistor R3 connected between the gate and cathode test terminals. Obviously, as this resistor is made smaller the apparent $dv/dt$ capability of the thyristor under test will increase.

The voltage V across test terminals A and B rises and falls with the application and removal of test voltages to these terminals as well as in accordance with the operation of the thyristor during a test cycle. The waveforms produced by this voltage are indicative of the operation of the thyristor and may be used for determining the two required parameters, namely, the forward blocking recovery time and the $dv/dt$ capability of the device. To facilitate observation of this voltage, the vertical plates of oscilloscope 6 are connected across the test terminals A and B. The horizontal plates of this oscilloscope are supplied with voltage from a sweep generator 5 which is started in operation by a pulse from pulse generator 1 simultaneously with the application of a pulse to either transformer 7 or transformer 9, depending upon the position of switch 17. When switch 17 is moved to its lower position, sweep generator 5 is activated by a pulse arriving from output conductor 2 which turns the test device on by reason of a pulse transmitted through transformer 9. The oscilloscope will start a sweep so that the vertical plates will display the waveform occurring across the test terminals. The manner by which these waveforms are used will be more fully described in conenction with FIGS. 3 and 4. When switch 17 is in its upper position, the sweep generator is caused to initiate a sweep when a voltage pulse on conductor 4 turns switch S2 on thereby generating the exponentially rising voltage across test terminals A and B. The $dv/dt$ terminal of switch 18 is connected to the junction between the capacitor C and resistor R which act as a differentiating circuit so that the voltage waveform occurring across resistor R represents the time derivative of voltage V across the test terminals. This waveform is observed on oscilloscope 6 and is interpreted in a manner to be subsequently described. Alternatively, capacitor C may be connected in series with a commercially available current probe which also develops a voltage proportional to the time derivative of the voltage across the test terminals. The output of the current probe is applied across the vertical plates of oscilloscope 6.

A few comments should be made with reference to some of the switches and diodes shown in FIG. 1. Zener diode Z1 should have a Zener voltage small compared with the voltage of source V1 but larger than the voltage drop across diode D2 and switch S1 when the latter is conducting. The effect of this is to cause diode Z1 to break down and apply voltage V1 to the test terminals when switch S1 is opened but when switch S1 is closed, diode Z1 will open to prevent the voltage drop across diode D2 and switch S1 from appearing across the test terminals. Diode D3 is back-biased when voltage is being applied to the test terminals by the circuits in block 16 and, similarly, diode D4 in block 16 is back-biased when voltage is being supplied to the test terminals by the circuits in block 15. In this way diodes D3 and D4 automatically isolate their circuits from the test terminals when the companion circuit is functioning. Implicit in this requirement is the requirement that both diodes D3 and D4 should have a fast recovery time relative to the recovery time of the thyristor under test. Thus, when reference is made in this specification, as well as in the claims to these diodes having a fast recovery time, it is to be understood that their rate of recovery is relative to the recovery time of the device under test. In order to obtain a large rate of voltage application, it is desirable that both the inherent inductance and the turn-on time of switch S2 be small. This implies, of course, that all connecting conductors must also be kept to minimum length in this circuit.

FIG. 2 shows a fragmentary portion of FIG. 1 including the three test terminals A, B and C and the transformer secondary 9S of transformer 9. This figure shows a conventional means involving switch 20 and a plurality of resistors R3 for conveniently changing the resistance between test terminals B and C.

In describing the operation of these circuits, reference will be made not only to FIG. 1 but also to the waveforms shown in FIGS. 3 and 4. To measure the rate effect, voltage source V1 in FIG. 1 is set to zero. Under these conditions, diode D3 will effectively isolate block 15 from all of the rest of the test circuits. Voltage source V2 is then adjusted to the specified test voltage which will generally not exceed the rated anode to cathode voltage of the test device. The thyristor to be tested is then connected to the test terminals A, B and C as shown in FIG. 1. If the test is to be made with a specific amount of gate-to-cathode resistance, that amount of resistance is connected between these circuits as indicated by resistor R3. It should here be mentioned that if the intrinsic rate effect is to be determined, it is made with this resistor disconnected. The pulse generator 1 will repetitively gate switch S2 on by a succession of pulses arriving over output conductor 4 through transformer 7 to the gate and cathode terminals of switch S2. Diode D6 in this circuit isolates the gate and cathode terminals of switch S2 from the transformer winding 7S during the reverse half cycle of the voltage pulse. The repetition rate of the pulses from generator 1 is slow enough that the time between successive pulses will permit switch S2 to open by current starvation since, when capacitor C2 is fully charged, the current through resistors R4, R5 and R6 is below the sustaining level.

Reference is now made to FIG. 3 wherein waveform 30 represents the voltage impressed across the test terminals A and B by the voltage appearing across capacitor C2. As indicated in FIG. 3, when switch S2 turns on, it starts the charge of capacitor C2 through resistor R5. This rising characteristic is the well known exponential characteristic of a capacitor charging through a resistor. As this capacitor reaches full charge, closely approximating the voltage of source V2, switch S2 opens by reason of current starvation and the characteristic begins to decay very rapidly with capacitor C2 discharging through the resistor R4. The initial slope of the rising portion of this voltage characteristic represents the maximum time rate of voltage change and determines whether or not this rate of voltage change will cause the test device to turn on. Obviously this slope, indicated by the line bearing the reference $dv/dt$ may be varied by changing the value of resistor R5 or the capacitance of capacitor C2. This resistor is gradually lowered in value to increase the time rate of voltage change ($dv/dt$) until the thyristor under test turns on. It will be understood that so long as this initial rate of voltage change is less than the critical value necessary to turn the thyristor on, the repetitive applications of voltage such as waveform 30 across test terminals A and B will cause no current to flow through the thyristor. The waveform 30 is observed on the oscilloscope screen by connecting switch 17 to its $dv/dt$ terminal and switch 18 to its voltage V terminal, i.e., the positions shown in FIG. 1. It will thus be seen that each time a voltage pulse over conductor 4 turns switch S2 on it also starts the sweep action of sweep generator 5, this sweep operation being entirely conventional. It may now be assumed that the rate of voltage rise is increased sufficiently as resistor R5 is lowered to produce the waveform 31, also shown in FIG. 3. At this instant, the initial rate of voltage rise $dv/dt$ has become critical so that a short time after this voltage is applied the test device turns on. The fact that the test device has turned on is readily observed by a sudden change in waveform from waveform 30 to that of waveform 31 of FIG. 3.

The magnitude of this rate of voltage change may be determined by various means. In FIG. 1 this is determined by moving switch 18 to its $dv/dt$ terminal. In this position the waveforms shown in the lower part of FIG. 3 would be observed. These waveforms are simply the time derivatives of the upper waveforms shown in FIG. 3. For example, waveform 32 is the time derivative of waveform 30 while waveform 33 is the time derivative of waveform 31. The initial slope of waveform 30 is represented by the peak value 34 of waveform 32 and similarly the peak value 35 of waveform 33 represents the maximum time rate of voltage change or initial slope of waveform 31. With switch 18 on its $dv/dt$ terminal, the voltage $v$ appearing across resistor R of the differentiating network is impressed across the vertical plates of oscilloscope 6 and consequently the peak value 35 is a direct measure of the $dv/dt$ at which the test device was turned on.

As previously mentioned, other means may be employed to determine this maximum rate of voltage change. In place of resistor R a conventional current probe may be introduced to indicate the rate of current change through differentiating capacitor C. Alternatively, this rate of voltage change may be computed from a knowledge of the voltage V2, the capacitance of capacitor C2 and the resistance of resistor R5.

To set up the circuit for measuring the forward blocking recovery time, voltage sources V1 and V2 are set to the specified operating anode to cathode voltage of the device under test. Switch 17 is moved to its $T_{fbr}$ position and switch 18 to its V position. The pulse generator 1 delivers a sequence of pulses over output lines 2, 3 and 4 in timed relation. The first pulse arrives over conductor 2 to turn on the thyristor under test. This same pulse is also applied through switch 17 to the sweep generator so as to start the sweep action. It may be assumed that a series of pulse cycles have been delivered by pulse generator 1 and that the capacitor C1 in the turn-off circuit in block 15 has just been charged exponentially to the voltage V1 as indicated by waveform 40 in FIG. 4. As previously described, this voltage also appears across test terminals A and B. When the test device turns on from the pulse arriving over conductor 2, there is a sudden drop of voltage across the test terminals A and B as indicated by the waveform 40 at the time "T.D. ON." The test device now conducts current until a pulse arriving from the pulse generator over conductor 3 is applied to the gate terminal of switch S1 through diode D5 thereby turning switch S1 on. When switch S1 is turned on, it promptly reduces the current through the test device to zero because switch S1 shorts source V1 and its series resistor R1. As previously mentioned, the small drop existing across the diode D2 and switch S1 is less than the Zener voltage of Zener diode Z1, thereby isolating the test device from the voltage source V1. When this happens, the minority carriers start to leave the test device so it starts to recover. It should be especially noted that the test circuit provides no current through the test device during this recovery period.

The pulse generator 1 now transmits a pulse over conductor 4 to turn switch S2 on, thereby causing the voltage to rise across capacitor C2 and, consequently, across the test terminals A and B. Resistor R5 is adjusted so that this initial rate of voltage rise is less than the critical value determined for this thyristor in the $dv/dt$ test. If the time interval between the instants that switches S1 and S2 are turned on is great enough, that is, greater than the forward blocking recovery time, the oscilloscope will simply show the voltage waveform 42 of FIG. 4 which indicates that the thyristor has recovered before switch S2 reapplied voltage to it. Under these conditions capacitor C2 continues to charge through resistor R5 and subsequently discharges through resistor R4 in the same manner previously described with reference to waveform 30 in FIG. 3. By shortening the time interval between the transmission of the pulses over conductors 3 and 4, the interval between turning switches S1 and S2 on is shortened until a point is reached where the thyristor under test has just failed to completely recover. In this case the characteristic 43 of FIG. 4 is developed. This time interval is the forward blocking recovery time. It should be kept in mind that, when making this test, the rate of voltage application from both sources V1 and V2 must be less than the critical value which will turn on a fully recovered thyristor.

A short time after the pulse generator has transmitted a pulse over conductor 4 to activate block 16, the resonant turn-off circuit in block 15 will complete its cycle as previously described and turn switch S1 off. Source V1 will then again recharge capacitor C1, causing a repetition of the waveform 40 as indicated by waveform 41 in FIG. 4. Pulse generator 1 continues to send out a series of pulses in sequence, first over conductor 2, then over conductor 3 and then over conductor 4, returning again to a pulse over a conductor 2, etc. The time interval between the pulses over conductors 3 and 4 is controlled by conventional means in the pulse generator 1, such means being well known in the art and requires no description at this time.

What is claimed is:

1. A test circuit for measuring the rate effect and the forward blocking recovery time of a thyristor having anode, cathode and gate terminals, said circuit comprising an anode test terminal, a cathode test terminal and a gate test terminal to which said anode, cathode and gate terminals of said thyristor may be connected, means for connecting a resistor between said gate and cathode terminals, a first supply means connected to apply a direct voltage across said anode and cathode test terminals in the forward conducting direction of said thyristor, said first supply means including a first switching means to effectively remove the application of said voltage and other means blocking the flow of any reverse current from said supply means through said thyristor, means for applying a gating pulse between said gate and cathode test terminals to cause a thyristor under test to conduct current supplied by said first supply means, a second supply means including a second switching means to apply a direct voltage across said anode and cathode test terminals in the forward conducting direction of said thyristor, means controlling the rate of rise of the voltage applied by said second supply means, means closing said second switching means a controlled time interval after said first switching means has removed the application of voltage from the test terminals, means for observing the voltage appearing across said anode and cathode test terminals, and means for determining the maximum rate at which the voltage rises across said anode and cathode test terminals.

2. The combination of claim 1 wherein the means for connecting a resistor between said gate and cathode terminals comprises a switch to selectively connect resistors of different known values between said terminals.

3. The combination of claim 1 wherein said second supply means comprises a source of direct voltage connected in series with said second switching means, a variable resistor and a capacitor, said capacitor being connected across said anode and cathode test terminals in series with a fast recovery diode.

4. The combination of claim 1 and a pulse generator having output terminals coupled to said first and second switching means and to said means for applying a gating pulse so that control pulses may be applied in timed sequence to all of said means.

5. A test circuit for measuring the rate effect and the forward blocking recovery time of a thyristor having anode, cathode and gate terminals, said circuit comprising an anode test terminal, a cathode test terminal and a gate test terminal to which said anode, cathode and gate terminals of said thyristor may be connected, means for connecting a resistor between said gate and cathode terminals, a first supply means comprising a source of direct voltage, a resistor, a Zener diode and a fast recovery diode connected in series with said anode and cathode test terminals to apply a direct voltage in the forward conducting direction of said thyristor, said first supply means including a first switching means connected across said source and said resistor to effectively remove the application of said voltage, means for applying a gating pulse between said gate and cathode test terminals to cause a thyristor under test to conduct current supplied by said first supply means, a second supply means including a second switching means to apply a direct voltage across said anode and cathode test terminals in the forward conducting direction of said thyristor, means controlling the rate of rise of the voltage applied by said second supply means, means closing said second switching means a controlled time interval after said first switching means has removed the application of voltage from the test terminals, means for observing the voltage appearing across said anode and cathode test terminals, and means for determining the maximum rate at which the voltage rises across said anode and cathode test terminals.

6. A test circuit for measuring the rate effect and the forward blocking recovery time of a thyristor having anode, cathode and gate terminals, said circuit comprising an anode test terminal, a cathode test terminal and a gate test terminal to which said anode, cathode and gate terminals of said thyristor may be connected, a first direct voltage supply means connected to apply a direct voltage across said anode and cathode test terminals for a predetermined period of time, means for applying a gating pulse between said gate and cathode test terminals during said predetermined period of time, a second direct voltage supply means connected to apply a direct voltage across said anode and cathode test terminals a measured interval of time after said predetermined period of time, means preventing the flow of any current through said thyristor during said measured interval of time, means controlling the rate of rise of the voltage applied by said second supply means, means for observing the voltage appearing across said anode and cathode test terminals, and means for determining the maximum rate at which the voltage rises across said anode and cathode test terminals.

7. The combination of claim 6 and a means for connecting a resistor between said gate and cathode terminals comprising a switch to selectively connect resistors of different known values between said terminals.

8. The combination of claim 6 wherein the said second supply means comprise a source of direct voltage connected in series with a switching means, a variable resistor and a capacitor, said capacitor being connected across said anode and cathode test terminals in series with a fast recovery diode.

9. The combination of claim 6 and a pulse generator having output terminals coupled to said first and second supply means and to said means for applying a gating pulse so that control pulses may be applied in timed sequence to all of said means.

10. A test circuit for measuring the rate effect and the forward blocking recovery time of a thyristor having anode, cathode and gate terminals, said circuit comprising an anode test terminal, a cathode test terminal and a gate test terminal to which said anode, cathode and gate terminals of said thyristor may be connected, a first direct voltage supply means comprising a source of direct voltage, a resistor, a Zener diode and a fast recovery diode connected in series with said anode and cathode test terminals to apply a direct voltage across said anode and cathode test terminals for a predetermined period of time, a switching means connected across said source and said resistor to remove the voltage applied across said test terminals at the end of said predetermined period of time, means for applying a gating pulse between said gate and cathode test terminals during said predetermined period of time, a second direct voltage supply means connected to apply a direct voltage across said anode and cathode test terminals a measured interval of time after said predetermined period of time, means controlling the rate of rise of the voltage applied by said second supply means, means for observing the voltage appearing across said anode and cathode test terminals, and means for determining the maximum rate at which the voltage rises across said anode and cathode test terminals.

References Cited

SCP and Solid State Technology (Dyer), April 1965, pp. 15–20.

RUDOLPH V. ROLINEC, *Primary Examiner.*

E. L. STOLARUN, *Assistant Examiner.*